US011631059B2

(12) United States Patent
Cummings

(10) Patent No.: US 11,631,059 B2
(45) Date of Patent: Apr. 18, 2023

(54) MAINTENANCE MANAGEMENT SYSTEM AND METHOD

(71) Applicant: CAROMA INDUSTRIES LIMITED, New South Wales (AU)

(72) Inventor: Stephen John Cummings, Newport (AU)

(73) Assignee: CAROMA INDUSTRIES LIMITED, New South Wales (AU)

( * ) Notice: Subject to any disclaimer, the term of this patent is extended or adjusted under 35 U.S.C. 154(b) by 251 days.

(21) Appl. No.: 16/479,899

(22) PCT Filed: Feb. 15, 2018

(86) PCT No.: PCT/AU2018/000022
§ 371 (c)(1),
(2) Date: Jul. 22, 2019

(87) PCT Pub. No.: WO2018/148782
PCT Pub. Date: Aug. 23, 2018

(65) Prior Publication Data
US 2019/0385128 A1    Dec. 19, 2019

(30) Foreign Application Priority Data
Feb. 16, 2017  (AU) ................................ 2017900507

(51) Int. Cl.
*G06Q 10/06* (2012.01)
*G06Q 10/20* (2023.01)
*G06Q 10/0631* (2023.01)

(52) U.S. Cl.
CPC ..... *G06Q 10/20* (2013.01); *G06Q 10/063112* (2013.01)

(58) Field of Classification Search
None
See application file for complete search history.

(56) References Cited

U.S. PATENT DOCUMENTS

| 8,970,391 B2 | 3/2015 | Hoekstra |
| 10,274,382 B1 * | 4/2019 | Trundle ................. G01K 13/00 |
| (Continued) | | |

FOREIGN PATENT DOCUMENTS

| WO | 03/021503 A2 | 3/2003 |
| WO | 2016/159953 A1 | 10/2016 |

OTHER PUBLICATIONS

Yiu, "Intelligent building maintenance—A novel discipline," *Journal of Building Appraisal* 3(4):305-317, 2008.

*Primary Examiner* — Alan Torrico-Lopez
(74) *Attorney, Agent, or Firm* — Seed Intellectual Property Law Group LLP

(57) ABSTRACT

A maintenance management system is disclosed. The system includes a processing device, a plurality of components in communication with the processing device, each component having a location associated with the component and one or more sensors for capturing usage data associated with the component, and user devices in communication with the processing device. Usage data of components is communicated to the processing device. The processing device determines from the usage data whether any of the components requires maintenance. The location of each respective component requiring maintenance is communicated to at least one of the one or more user devices from the processing device.

15 Claims, 3 Drawing Sheets

(56) References Cited

U.S. PATENT DOCUMENTS

| | | | |
|---|---|---|---|
| 2007/0200664 A1* | 8/2007 | Proska | G08G 1/205 |
| | | | 340/5.42 |
| 2009/0119142 A1 | 5/2009 | Yenni et al. | |
| 2010/0274640 A1 | 10/2010 | Morey et al. | |
| 2016/0132839 A1 | 5/2016 | Randolph | |
| 2017/0123421 A1* | 5/2017 | Kentley | G06Q 10/00 |
| 2018/0293677 A1* | 10/2018 | Oakes | G06Q 30/0633 |

* cited by examiner

MAINTENANCE MANAGEMENT SYSTEM AND METHOD

BACKGROUND

Technical Field

The present disclosure relates generally to a maintenance management system and method.

Description of the Related Art

Generally, components within most systems require regular maintenance of one form or another. Such maintenance may include replacement of the component, or a sub-component, after a predefined period of operation. Other maintenance may include inspection of the component, typically also after a predefined period of operation. Yet further maintenance may merely include cleaning the component.

Other than "routine" maintenance, maintenance is also performed on an "on-demand" basis. With different components having different maintenance requirements, scheduling such maintenance is often a very complex problem. The manner in which such scheduling is typically performed either results in too much maintenance or not enough maintenance. Also, the scheduled maintenance is typically not adaptive to the status or frequency of use of the system.

A need exists for a maintenance management system to assist in the scheduling of maintenance.

BRIEF SUMMARY

It is an object of the present disclosure to substantially overcome, or at least ameliorate, one or more disadvantages of existing arrangements, or to at least provide the public with a useful choice.

Disclosed is a maintenance management system comprising:
a processing device;
a plurality of components in communication with the processing device, each component having a location associated with the component and one or more sensors for capturing usage data associated with the component; and
one or more user devices in communication with the processing device,
wherein the usage data of components is communicated to the processing device and the processing device determines from the usage data whether any of the components requires maintenance, where the location of each respective component requiring maintenance is communicated to at least one of the one or more user devices from the processing device.

Other aspects of the present disclosure are also disclosed.

BRIEF DESCRIPTION OF THE SEVERAL VIEWS OF THE DRAWINGS

At least one embodiment of the present disclosure will now be described with reference to the drawings and appendices, in which.

DETAILED DESCRIPTION

Figure 1:
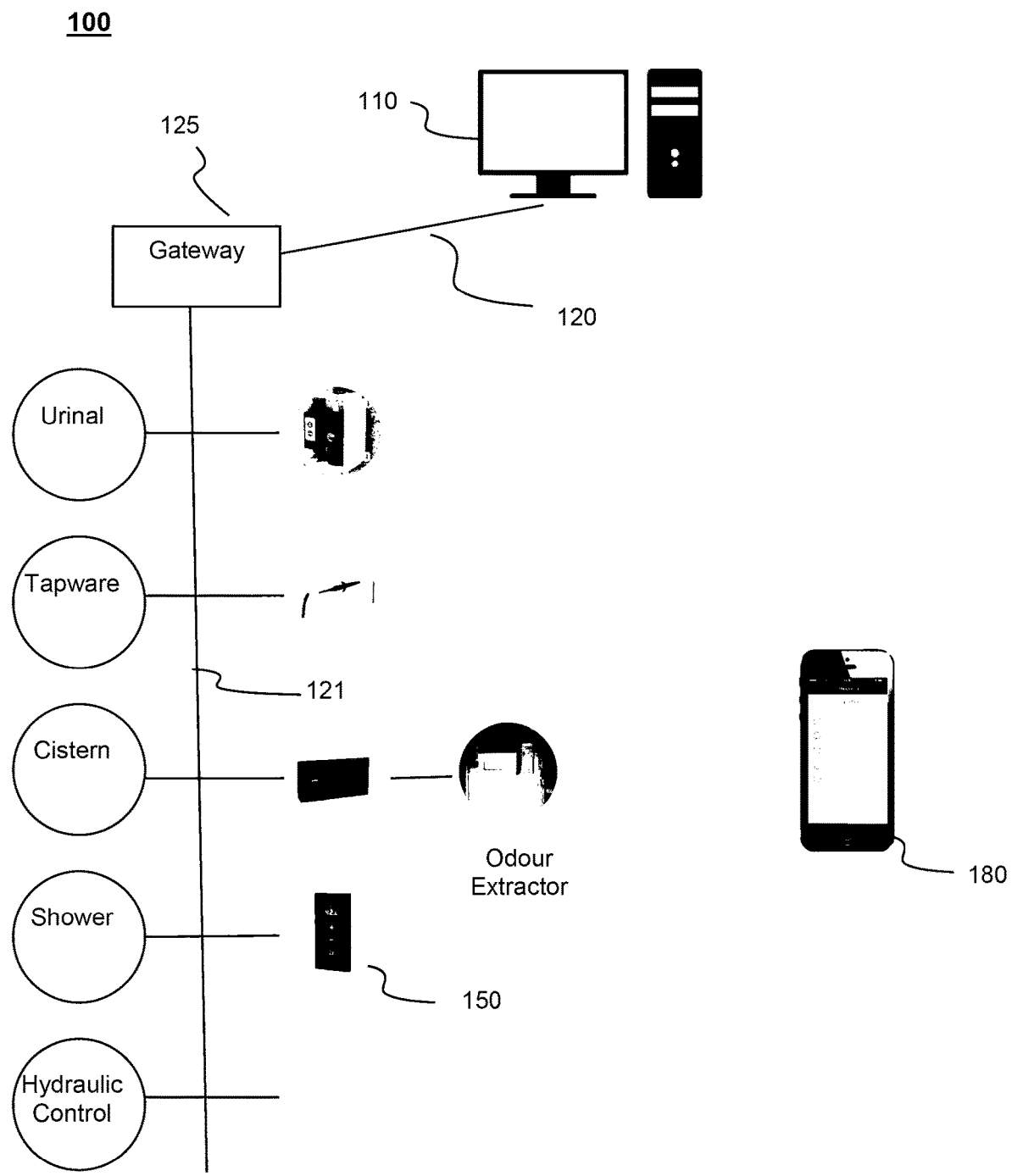
FIG. 1 shows a Bathroom Maintenance Management System according to the present disclosure.

FIG. 1 shows a system 100 according to the present disclosure. In the preferred implementation the system 100 is a Bathroom Maintenance Management System. System 100 includes a server 110 connected to a network 120. The network 120 is typically an Ethernet Local Area Network (LAN). The server 110 has one or more processors (not illustrated) and data storage devices (not illustrated). The operation of the server 110 is controlled through software instructions stored on the data storage devices and executed by the processor(s).

The system 100 further includes a number of components $150_1$ to $150_N$, each having a processor (not illustrated) connected to the network 120. In the preferred implementation the components $150_1$ to $150_M$ are bathroom components, such as faucets, toilets, urinals, showers, etc. The components $150_1$ to $150_N$ may be connected directly to the network 120. Alternatively, in a preferred embodiment, two or more components $150_n$ may be connected to a sub-network 121, with the sub-network 121 being connected to the network 120 through a gateway 125. In a further preferred embodiment, the components $150_1$ to $150_N$ may be connected directly to the gateway 125, and thereby connected to the network 120.

Each component $150_n$ has an identifier (ID) unique in the system 100. Each component $150_n$ also has a location associated thereto. In one implementation the location is captured during installation. That location may be obtained through consulting a floor plan or "maps" generally, or through the use of a handheld location determining device, such as an Indoor Positioning System (IPS) or a Global Positioning System (GPS) device. In another implementation the component $150_n$ includes an IPS or GPS device for determining the location associated with the component $150_n$.

Each component $150_n$ also has associated thereto one or more sensors (not illustrated) for capturing usage data. The usage data of each component $150_n$ is communicated to the servers 110 for processing in the manner described below. For example, the sensors may enable the system 100 to determine the number of times component $150_n$ has been used since a relevant event, such as cleaning or maintenance. For example, the sensor may be a water flow sensor in a water supply pipe of a faucet. By counting the water flow cycles, a determination can be made of the number of times the faucet, and basin associated with the faucet, have been used. Many of the components $150_n$ may be "automatic sensor hands free" components, in which case the component $150_n$ includes a movement or proximity sensor detecting a user, which in turn activates the component $150_n$. For example, in the case where the component $150_n$ is a "hands free" faucet, each hands free activation may be counted as a single use. The sensors may also include odor sensors allowing the system to determine that components $150_n$ associated with the odor sensors, such as toilets and urinals for example, require cleaning.

The system 100 further includes user devices $180_1$ to $180_K$, such as mobile telephones and/or tablet computers. Each user device $180_k$ is in communication with the server 110. In the preferred implementation the user device $180_k$ has a self-contained program (generally referred to as an "App") executing within a processor of the user device $180_k$. The App is in communication with the server 110 through the Internet (not illustrated) via a suitable network connection. The App would be customized for specific maintenance persons, including actions and lists relevant to the maintenance tasks performed by that person.

Figure 2:
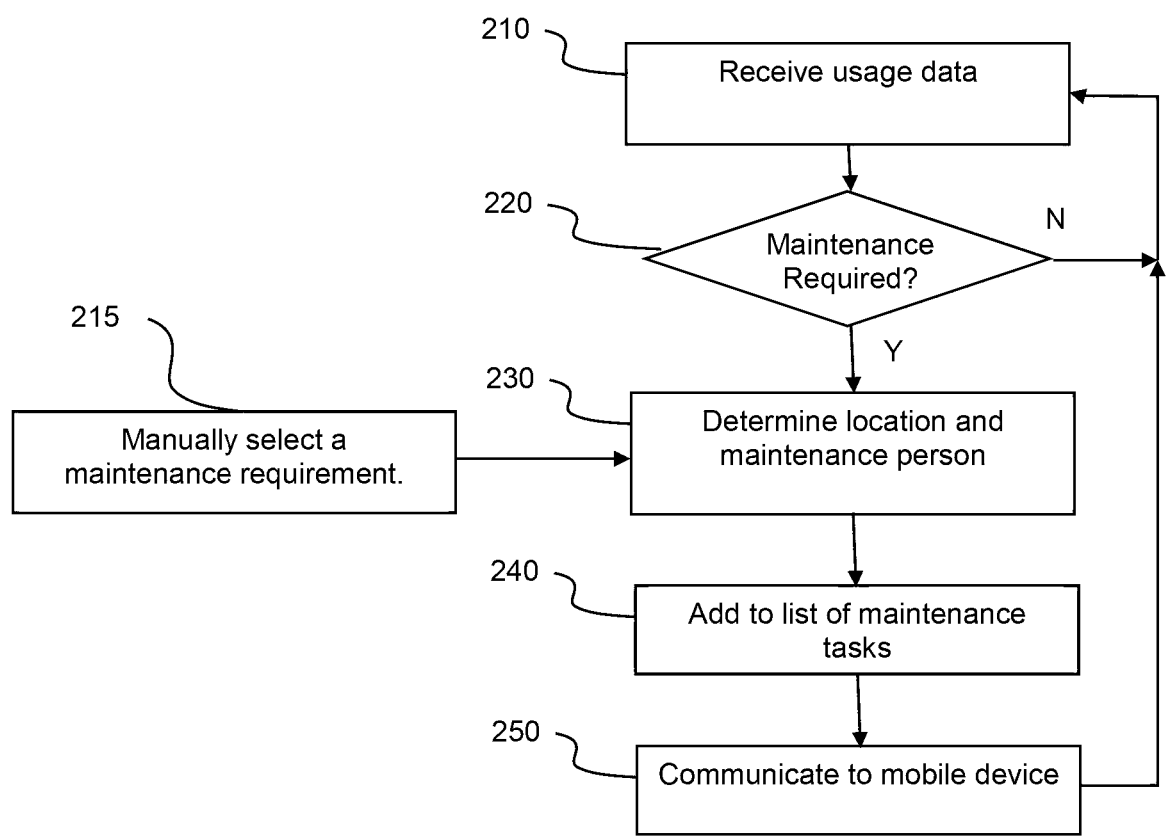
FIG. 2 shows a schematic flow diagram of a method 200 of managing maintenance.

Having described the elements of the system 100, the operation of the system 100 is next described. FIG. 2 shows a schematic flow diagram of a method 200 of managing maintenance. Different maintenance events may be provided for, for example routine maintenance, repairs, and cleaning. The method is described generally with respect to maintenance, and would operate similarly for different forms of maintenance, be it with different thresholds as would be apparent to one of ordinary skill in the art. The method 200 is affected through a program executing in the processor of the server 110.

The method 200 starts in step 210 where the server 110 receives usage data from each of the components $150_n$ in real time. More particularly, the received usage data is associated with the ID of the component $150_n$.

Step 220 follows where the server 110 determines from the usage data whether any of the components $150_n$ requires maintenance. For example, in one implementation the usage data is the time that elapsed since the last relevant maintenance event, such as repair or cleaning, for that component $150_n$, and the server 110 determines whether the usage data exceeds a predetermined threshold. In another implementation the usage data is the number of times the component $150_n$ has been used since the last relevant maintenance event, such as repair or cleaning, for that component $150_n$. It would be understood that the threshold applicable for cleaning would be much less than, for example, the threshold for routine maintenance. In yet another implementation the usage data relates to the flow rate associated with the component $150_n$ and the server 110 determines that the flow rate is outside predefined parameters, which is indicative that component $150_n$ is faulty and therefore requires to be repaired.

If it is determined by the server 110 in step 220 from the usage data that none of the components $150_n$ require maintenance, the method 200 returns to step 210.

If it is determined in step 220 that at least one of the components $150_n$ require maintenance, the method 200 continues to step 230 where the location of each respective component $150_n$ requiring maintenance, and a maintenance person relevant to the type of maintenance required are determined, typically through use of a look-up table. As would be understood, if cleaning is required, a cleaner would be the relevant maintenance person, whereas replacement of a seal of a cistern as part of routine maintenance would require a plumber as the relevant maintenance person.

Figure 3:
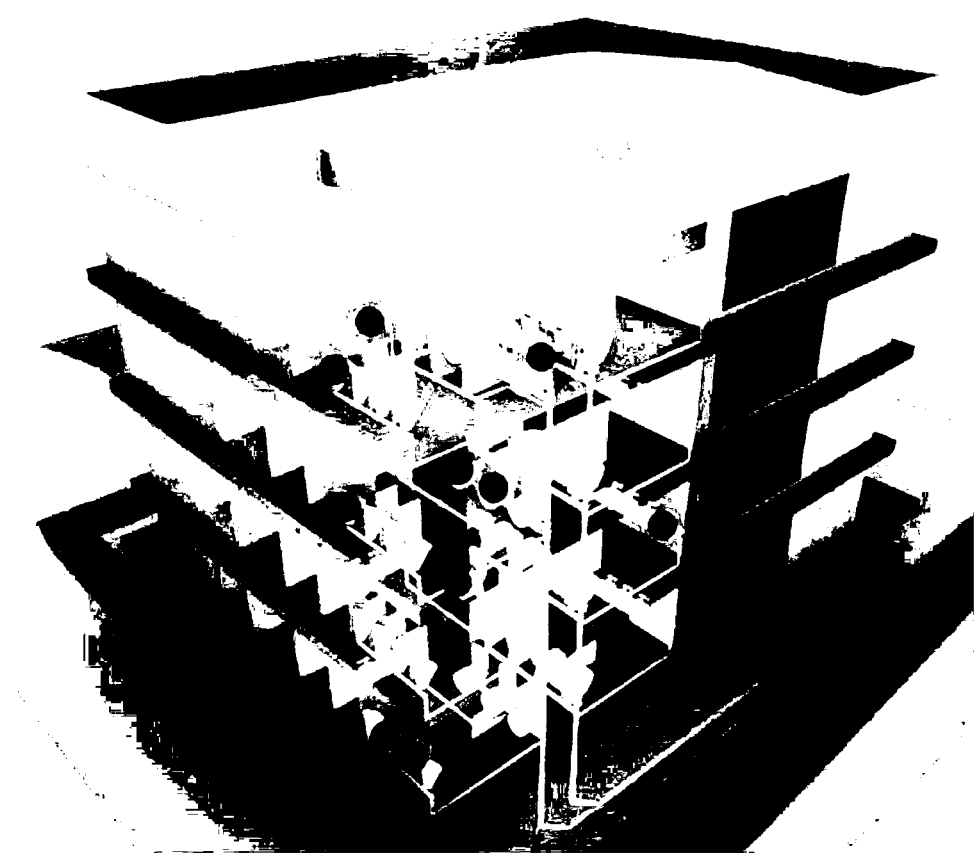
FIG. 3 illustrates locations of component requiring maintenance being displayed within a 3 dimensional schematic of a building.

In step 240 that follows, the requirement for maintenance is added to a list of maintenance tasks allocated for the relevant maintenance person. The requirement for maintenance includes details of the component $150_n$, details of the maintenance required, and the location of the component $150_n$. In step 250 the list of maintenance tasks allocated to the relevant maintenance person is communicated to the mobile device $180_k$ associated with the person, where the list is displayed on a display screen of the device $180_k$ through the App. FIG. 3 shows an example of a display that may be presented to a maintenance person, indicating graphically those components $150_n$ requiring maintenance.

In the preferred implementation the server 110 contains a detailed geographical mapping of the building being monitored. The App and/or the server 110 uses that detailed geographical mapping of the building to provide on the display of the user device $180_k$ directions from a current location, determined using a location determining system such as IPS or GPS, to the location of the component $150_n$.

In a preferred implementation the list is ordered in order to optimize the maintenance. For example, the App or server 110 may determine an order which minimizes travel time between locations. The travel time between the locations is determined using the above-mentioned detailed geographical mapping. The App also displays the respective locations of the components $150_n$ requiring maintenance on a map or floor plan. In a preferred implementation the locations are displayed within a 3 dimensional schematic of the building, such as the schematic illustrated in FIG. 3. Following step 250 the method 200 return to step 210.

Once maintenance has been completed, the maintenance person is able, using the App on the mobile device $180_k$, to notify the server 110 that the maintenance has been completed. In a preferred implementation the maintenance person uses the App to disable the component $150_n$ during maintenance, and again enables the component $150_n$ after the maintenance has been completed. This action notifies the server 110 that maintenance has been completed and removes the requirement for maintenance from the list of maintenance tasks allocated for the relevant maintenance person, and also resets the time and count since the last maintenance event as appropriate.

The system 100 is particularly useful for managing cleaning services. The App on each cleaner's user device $180_k$ presents a list of cleaning tasks allocated to that cleaner. The list of cleaning tasks is ordered in order to optimize the maintenance by taking in consideration the travel time between locations. The order is determined, at least, by the location of the relevant maintenance person and location of each cleaning task (e.g., the distance). The relevant maintenance person is relevant due to the type of maintenance required (e.g., a cleaner, a plumber, etc.). The urgency of each cleaning task may be taken into account. The urgency may be determined on the basis of sensor data from the component $150_n$ and the time elapsed since the cleaning task was created. The App displays directions from a current location to the location of the next component $150_n$ requiring cleaning. When the cleaner arrives at the location, he/she is able to de-activate the component $150_n$ requiring cleaning, via the App. Once the cleaning has been completed, the cleaner is able to use the App to re-activate the component $150_n$. The re-activation notifies the server 110 that the cleaning has been completed and removes the requirement for cleaning from the list of cleaning tasks. Optionally, the maintenance person is able to de-activate all components $150_n$ in a particular location using the App, such as for example a bathroom. This facilitates the de-activation of all components $150_n$ (and/or the associated sensors) in a location during routine or non-routine maintenance of the location. Further, de-activation of the one or more component $150_n$ may start a timer counting down a pre-determined period of time. The pre-determined period of time may be set to allow for cleaning of the one or more component $150_n$. When the timer has elapsed, the one or more component $150_n$ may be automatically re-activated, notifying the server 110 that cleaning has been completed and the requirement for cleaning is removed from the list of cleaning tasks.

The system 100 may also include user device $180_k$ operated by clients. The server 110 determines current low usage rate components $150_n$, and such current low usage rate components $150_n$ are then communicated to an App executing on the user device $180_k$ where those current low usage rate components $150_n$ are displayed on the App. This enables clients to determine, for example, which toilets have the shortest queues. The server 110 additionally or alternatively determines components $150_n$ which have had low usage since the last cleaning event and such components $150_n$ are then communicated to the App executing on the user device $180_k$ where those components $150_n$ are displayed on the App. In the case of toilets for example, those toilets that have had low usage since the last time they have been cleaned can be assumed to be the cleanest toilets, and this information may be of use to users.

In a further implementation the user device $180_k$ operated by clients may be used by the clients to provide input to the server 110 with regards to a parameter of or associated with the component $150_n$. For example, the client may use the App to provide feedback with regards to the cleanliness of the toilets. This feedback may be displayed on the Apps of the clients, enabling clients to locate cleaner toilets.

In a further embodiment it is possible to enter manually, via the App, maintenance that is required in step 215. Step 215 may be performed from a user device $180_k$ operated by a maintenance services supervisor, or from a user device $180_k$ operated by the maintenance person. The supervisor may, via the App on their user device $180_k$, select the component $150_n$ that requires maintenance, the selection being communicated to the server 110.

Step 215 is followed by step 230 wherein the server 110 determines the location of the maintenance requirement, and the location of a maintenance person relevant to the type of maintenance required, typically through use of a look-up table. A list of suitable maintenance persons is provided by the server 110 to the user device $180_k$ operated by the maintenance services supervisor in an order. The order is determined by the server 110, at least, on the basis of the capability of the maintenance persons of performing the required maintenance and the distance of the maintenance person from the required maintenance (e.g., the location of the component).

At step 240, the supervisor subsequently selects the maintenance person to which the maintenance requirement should be communicated from the list of suitable maintenance persons. At step 250, the server 110 then communicates the maintenance requirement to the user device $180_k$ of the selected maintenance person.

The foregoing describes only some embodiments of the present disclosure, and modifications and/or changes can be made thereto without departing from the scope of the disclosure, the embodiments being illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A bathroom component repair optimization system, comprising:
a server including a processing device;
a plurality of bathroom components in communication with the processing device, each bathroom component having a unique identifier, an indoor positioning system device that determines a three dimensional location associated with the bathroom component, and one or more sensors for capturing usage data associated with the bathroom component, wherein usage data including flow rate, and wherein if the flow rate is determined to be outside of predefined parameters then the bathroom component is faulty and is required to be repaired;
one or more user devices in communication with the processing device, each user device including a display and an indoor positioning system device,
wherein the usage data of bathroom components is communicated to the processing device and the processing device determines from the usage data whether any of the bathroom components requires maintenance including repairing of a bathroom component, where the location of each respective bathroom component requiring repair is communicated to at least one of the one or more user devices from the processing device,
wherein, when more than one bathroom component requires repair, a list ordered in an order to optimize repair of the bathroom component repair optimization system is presented on the user device, wherein an App or the server determines the order which minimizes repair time of the bathroom component repair optimization system,
wherein the server generates a detailed geographical mapping in a three dimensional schematic of the building being monitored that is displayed on the user device with directions from a current location, determined using the indoor positioning system device of the user device, to the three dimensional location of the bathroom component to be repaired;
wherein the system further comprises:
a timer, the timer counting down from a pre-determined amount of time, wherein the timer is started when the one or more sensors of a bathroom component requiring repair are de-activated, and wherein, when the timer has elapsed, the one or more sensors are re-activated and the bathroom component requiring repair is removed from the list.

2. The system according to claim 1 wherein the processing device further determines a maintenance person relevant to the type of maintenance required, and the location of each respective bathroom component requiring maintenance is communicated to the user device of the maintenance person relevant to the type of maintenance required.

3. The system according to claim 1 wherein at least one of the bathroom components include a location determining device for determining the location associated with the bathroom component.

4. The system according to claim 1, wherein at least one of the bathroom components requires maintenance when the usage data exceeds a predetermined threshold.

5. The system according to claim 1, wherein at least one of the bathroom components requires maintenance when the usage data is outside predefines parameters.

6. The system according to claim 1, wherein the order is determined on the basis of:
the location associated with the bathroom component, and
a location of a maintenance person relevant to a type of maintenance required.

7. The system according to claim 6, wherein the order is further determined on the basis of an urgency of the bathroom component requiring maintenance, wherein the urgency is determined on the basis of:
> a time that has elapsed since the processing device determined that the bathroom component requires maintenance; and
> the usage data captured from the one or more sensors associated with the bathroom component.

8. The system according to claim 1, wherein the one or more sensors are a plurality of sensors in a single location.

9. A method for improving functionality of a bathroom component repair optimization system, the method comprising:
> accessing a server including a processing device, the processing device in communication with one or more user devices, each user device including a display and an indoor positioning system device;
> capturing usage data, via one or more sensors, associated with respective bathroom components, wherein usage data including flow rate, and wherein if the flow rate is determined to be outside of predefined parameters then the bathroom component is faulty and is required to be repaired, each bathroom component having a unique identifier, an indoor positioning system device that determines a three dimensional location associated with the bathroom component;
> determining, via the processing device, from the usage data whether any of the bathroom components requires maintenance including repairing of a bathroom component;
> communicating the location of each respective bathroom component requiring repair to at least one user device from the processing device;
> wherein, when more than one bathroom component requires repair, the method further comprises presenting on the user device a list ordered in an order to optimize repair of the bathroom component repair optimization system, wherein an App or server determines the order which minimizes repair time of the bathroom component repair optimization system,
> generating a detailed geographical mapping, via the server, in a three dimensional schematic of the building being monitored that is displayed on the user device with directions from a current location, determined using the indoor positioning system device of the user device, to the three dimensional location of the bathroom component to be repaired, and
> counting down from a pre-determined amount of time using a timer, wherein the timer is started when the one or more sensors of a bathroom component requiring repair are de-activated, and wherein, when the timer has elapsed, the one or more sensors are re-activated and the bathroom component requiring repair is removed from the list.

10. The method according to claim 9 further comprising the step of determining a maintenance person relevant to the type of maintenance required, wherein the location of each respective bathroom component requiring maintenance is communicated to the user device of the maintenance person relevant to the type of maintenance required.

11. The method according to claim 9, wherein at least one of the bathroom components requires maintenance when the usage data exceeds a predetermined threshold.

12. The method according to claim 9, wherein at least one of the bathroom components requires maintenance when the usage data is outside predefined parameters.

13. The method according to claim 9, wherein the order is determined on the basis of:
> the location associated with the bathroom component, and
> a location of the maintenance person relevant to the type of maintenance required.

14. The method according to claim 13, wherein the order is further determined on the basis of an urgency of the bathroom component requiring maintenance, wherein the urgency is determined on the basis of:
> a time that has elapsed since the processing device determined that the bathroom component requires maintenance; and
> the usage data captured from the one or more sensors associated with the bathroom component.

15. The method according to claim 9, wherein the one or more sensors are a plurality of sensors in a single location.

* * * * *